United States Patent
Wilhelm (10) Patent No.: US 11,035,702 B2
(45) Date of Patent: Jun. 15, 2021

(54) METHOD FOR DETERMINING A MEASUREMENT UNCERTAINTY OF A MEASURED VALUE OF A FIELD DEVICE

(71) Applicant: Endress+Hauser Conducta GmbH+Co. KG, Gerlingen (DE)

(72) Inventor: Thomas Wilhelm, Chemnitz (DE)

(73) Assignee: Endress+Hauser Conducta GmbH+Co. KG, Gerlingen (DE)

(*) Notice: Subject to any disclaimer, the term of this patent is extended or adjusted under 35 U.S.C. 154(b) by 375 days.

(21) Appl. No.: 15/834,282

(22) Filed: Dec. 7, 2017

(65) Prior Publication Data
US 2018/0172488 A1    Jun. 21, 2018

(30) Foreign Application Priority Data

Dec. 7, 2016    (DE) .................... 10 2016 123 699

(51) Int. Cl.
| | |
|---|---|
| G01D 18/00 | (2006.01) |
| G06F 17/18 | (2006.01) |
| G01D 3/02 | (2006.01) |
| G01D 21/00 | (2006.01) |
| G01D 3/036 | (2006.01) |

(52) U.S. Cl.
CPC ............ *G01D 18/00* (2013.01); *G01D 3/022* (2013.01); *G01D 3/036* (2013.01); *G01D 21/00* (2013.01); *G06F 17/18* (2013.01)

(58) Field of Classification Search
CPC ........ G01D 3/022; G01D 3/036; G01D 21/00; G01D 18/00; G06F 17/18
See application file for complete search history.

(56) References Cited

U.S. PATENT DOCUMENTS

| | | | |
|---|---|---|---|
| 6,738,682 B1* | 5/2004 | Pasadyn ................. | G05B 13/04 700/100 |
| 2008/0125982 A1 | 5/2008 | Yoshihiro et al. | |
| 2008/0270162 A1* | 10/2008 | Machacek .......... | G05B 23/0221 702/182 |

FOREIGN PATENT DOCUMENTS

| | | |
|---|---|---|
| DE | 10120235 A1 | 10/2002 |
| WO | 2016134766 A1 | 9/2016 |

OTHER PUBLICATIONS

Search Report for German Patent Application No. 10 2016 123 699.3, German Patent Office, dated Aug. 12, 2017, 7 pp.

* cited by examiner

*Primary Examiner* — Mischita L Henson
(74) *Attorney, Agent, or Firm* — Kelly J. Smith; Endress+Hauser (USA) Holding Inc.

(57) ABSTRACT

The present disclosure relates to a computer-implemented method for determining at least one measurement uncertainty for at least one measured value of a field device, in which a set of calculation parameters is created that contains at least all standard parameters of a set of standard parameters in the form of a respectively corresponding calculation parameter, and the at least one measurement uncertainty and/or a measurement uncertainty budget is calculated and/or specified based upon at least one calculation parameter value of at least one calculation parameter. Each standard parameter of the set of standard parameters comprising at least one standard parameter represents an independent variable causing the measurement uncertainty. To each calculation parameter is assigned at least one calculation parameter value in the form of at least one standard parameter value, one device parameter value, and/or one application parameter value.

18 Claims, 2 Drawing Sheets

METHOD FOR DETERMINING A MEASUREMENT UNCERTAINTY OF A MEASURED VALUE OF A FIELD DEVICE

CROSS-REFERENCE TO RELATED APPLICATION

The present application is related to and claims the priority benefit of German Patent Application No. 10 2016 123 699.3, filed on Dec. 7, 2016, the entire contents of which are incorporated herein by reference.

TECHNICAL FIELD

The present disclosure relates to a method in particular, a computer-implemented method for determining at least one measurement uncertainty for at least one measured value of a field device. The present disclosure furthermore relates to a computer program for determining the measurement uncertainty and to a computer program product with a corresponding computer program.

BACKGROUND

Field devices for determining, monitoring, and/or influencing various process variables are frequently used in process and/or automation technology. Examples of such field devices or measuring devices are fill-level measuring devices, flow measuring devices, pressure and temperature measuring devices, pH and/or pH redox potential measuring devices, or even conductivity measuring devices, which serve to detect the respective corresponding process variables, such as a fill-level, a flow, the pressure, the temperature, a pH value, a redox potential, or a conductivity. The respectively underlying measuring principles are sufficiently known from the prior art and are not listed individually at this point. Flow-measuring devices are, in particular, Coriolis, ultrasound, vortex, thermal, and/or magnetically inductive flow-measuring devices. Fill-level measuring devices are, in particular, microwave fill-level measuring devices, ultrasonic fill-level measuring devices, time domain reflectometry fill-level measuring devices (TDR), radiometric fill-level measuring devices, capacitive fill-level measuring devices, conductive fill-level measuring devices, and/or temperature-sensitive fill-level measuring devices. The pressure measuring devices, on the other hand, are preferably so-called absolute, relative, or differential pressure devices, whereas the temperature measuring devices frequently have thermal elements or temperature-dependent resistors for determining the temperature.

Within the scope of the present application, all devices that are arranged on the field level, i.e., are used close to the process and provide or handle process-relevant information, are, in principle, called field devices. In addition to sensors and actuators, units that are directly connected to a field bus and used for communication with a control unit, such as a control system, e.g., remote I/O's, gateways, linking devices, and wireless adapters or radio adapters, are also generally called field devices. The companies of the Endress+Hauser Group produce and distribute a large variety of such field devices.

The measured values measured by means of a measuring device are fundamentally afflicted by a measurement error, which can be detected, for example, in the form of a measured value deviation or a measurement uncertainty. It is of the utmost importance that the measurement uncertainty can be determined as accurately as possible.

Within the framework of measurement deviations, a distinction is often made between systematic and random measurement deviations. A systematic measurement deviation includes a systematic shift of the measured value. A random measurement deviation, on the other hand, is related to the fact that measured values of repeated measurements are not identical, wherein a current measured value cannot be predicted based upon the previous measured values. For estimating a measurement uncertainty, various methods, such as error analyses or error calculations, are known from the prior art. Reference is also made in this respect to the ISO/BIPM guide, GUM (ISO/IEC Guide 98-3.2008, GUM="Guide to the Expression of Uncertainty in Measurement"), which aims at specifying an international standard procedure for determining measurement uncertainties, and thus making measurement results comparable worldwide.

In order to determine a measurement uncertainty, a description in particular, a mathematical description of the measuring point is usually created in a first step, and at the same time, possibly using existing in particular, statistical data, the independent variables relevant to the measurement are determined. This can take place, for example, based upon one or more so-called Ishikawa diagrams, which are, per se, known from the prior art. In many cases, sensitivity coefficients for the uncertainties of the measured variables relevant to the measurement and the respectively determined independent variables are also determined for example, based upon the Monte Carlo method also known from the prior art. In this way, values and distribution functions can respectively be specified for the uncertainties of the measured variables and the independent variables, and, proceeding therefrom, the measurement uncertainty of the dependent variable, e.g., of the measured value of a field device, can be calculated for example, using a quadratic error propagation.

The accuracy in the specification of a measurement uncertainty basically depends upon knowledge of the most varied and, in particular, most different factors. In this respect, the specifications of the respective field device, the respectively used measuring methods, i.e., even the most varied environmental and framework conditions, among other things, play a crucial role. Some of these factors or independent variables are not constant over time.

With respect to the specification of measurement uncertainties, a measuring device with at least one sensor, a processor, a memory, and an output interface is, for example, known from WO2016/134766A1. At least in one region of the memory, device-specific and/or application-specific data are stored, on the basis of which the processor performs a calculation of a measured value deviation. Thus, an individual estimation of the measurement uncertainty is not carried out only once, e.g., at the time of delivery of the measuring device, but a current value for the measurement uncertainty can instead be determined at any time.

In their article, "Einflüsse realer Einsatzbedingungen auf die pH-Messung mit Glaselektroden" [Influences of Real Operating Conditions on pH Measurement with Glass Electrodes] (Technisches Messen [Technical Measurement] 77 (2010) 3 DOI 10.1524/teme.2010.0046, Oldenbourg Wissenschaftsverlag), T. Wilhelm and T. Pechstein further explain, using the example of a pH measuring device with a pH glass electrode, various problems in connection with a truly accurate and complete determination of the measurement uncertainty. Without precise knowledge of the operating process of the respective measuring device, it is not possible to specify a measurement error accurately. Reference is hereby made to this article in its entirety.

SUMMARY

Proceeding from the prior art, the present disclosure is based upon the aim of being able to determine a measurement uncertainty of a field device as accurately as possible.

The aim underlying the present disclosure is achieved by the method in particular, a computer-implemented method for determining at least one measurement uncertainty for at least one measured value of a field device according to claim 1, by the computer program according to claim 18, and by the computer program product according to claim 19.

The method according to the present disclosure includes the creation of a set of calculation parameters and the determination and/or specification of at least one measurement uncertainty and/or a measurement uncertainty budget based upon at least one calculation parameter value of at least one calculation parameter.

According to the present disclosure, the set of calculation parameters includes at least all standard parameters of a set of standard parameters in the form of a respectively corresponding calculation parameter, wherein each standard parameter of the at least one set of standard parameters containing a standard parameter represents an independent variable causing the measurement uncertainty.

By means of the set of standard parameters, ideally all relevant physical and/or chemical independent variables are included in the form of respectively at least one standard parameter. The set of standard parameters ideally contains all known and conceivable independent variables and allows for a comprehensive and complete measuring point description based upon the standard parameters. However, when creating the set of standard parameters, not all values for all independent variables are usually sufficiently known, because, for an accurate determination of the measurement uncertainty, variables that relate to the production of the field device or to the planned application, i.e., the planned operating process, also play an important role, for example. For this reason, in addition to the set of standard parameters, sets of more specific parameters, which are relevant to certain specifications of the field device, in the form of suitable subsets of the set of standard parameters, are included according to the present disclosure.

A set of device parameters, which includes a subset of the standard parameters in the form of respectively corresponding device parameters, represents such independent variables, which are specific to the field device for example, to its construction. Moreover, a set of application parameters, which also includes a subset of the standard parameters in the form of respectively corresponding application parameters, is included. In this case, the application parameters in turn represent independent variables that are specific to a certain application of the field device. The set of device parameters and the set of application parameters thus represent, in principle, a set of parameters subordinate to the set of standard parameters.

The set of device parameters can, for example, be created or be equipped with parameter values in the course of the production of the respective field device. The same applies to the set of application parameters, which can, for example, be created as part of the planned applications. In this context, an application is preferably understood to be a planned use, or the planned application of the field device, and/or the class of the planned measuring point, i.e., the planned operating process.

According to the present disclosure, at least one calculation parameter value can now be assigned to each calculation parameter. In this case, the calculation parameter value can respectively be at least one standard parameter value of the respectively corresponding standard parameter, a device parameter value of the respectively corresponding device parameter, or an application parameter value of the respectively corresponding application parameter. Parameter values of the set of device parameters and of the set of application parameters can thus be incorporated into the set of calculation parameters in addition to the standard parameter values.

Advantageously, the independent variables or values and/or distributions for the independent variables, which are not uniquely relevant to the calculation and/or specification of a measurement uncertainty and/or of a measurement uncertainty budget, are thus determined. Rather, different knowledge is used for different independent variables. The set of standard parameters can, for example, be determined in the course of the development of the respective field device. Independent variables specific to the construction of the field device can, in turn, be determined, for example, in the course of the production of the field device or based upon an analysis in particular, a statistical analysis of data of a quality control performed, where applicable, or a calibration in particular, of a factory calibration of one or more field devices. Finally, with respect to independent variables specific to a planned application of the field device, it is possible to determine these independent variables during the planning of the respective process, or on the basis of an in particular, statistical analysis of a measuring point similar to the planned measuring point. In contrast to the prior art, the respectively relevant independent variables or values for the independent variables are thus compiled from various sets of parameters and can thus originate from different sources and be continuously updated and specified. Instead of a rough estimate of a parameter value during the creation of the set of standard parameters, significantly more accurately determined parameter values of the set of device parameters and/or of the set of application parameters can, for example, be included in the set of calculation parameters. This approach advantageously allows for an optimal adaptation of the variables relevant to determining a measurement uncertainty to the respective measuring device and to the respective application, and thus a particularly accurate determination of the measurement uncertainty.

In one embodiment of the method according to the present disclosure, the at least one independent variable is an environmental condition, e.g., the ambient temperature or the ambient pressure or the ambient humidity; a process condition, e.g., the process temperature, the process pressure, or a flow velocity of a process medium; or information from a calibration, qualification, and/or adjustment of the field device, e.g., a sampling, an uncertainty of at least one transfer normal; or at least one secondary variable that is included in the determination of a measured value measured by means of the field device. These so-called secondary variables are, for example, given by the temperature or by a pH value, wherein a pH value is, in particular, relevant in connection with a redox potential or in connection with a chlorine measurement. The respectively relevant independent variables vary in this respect according to the type of the field device and according to the measuring method used. It is thus not possible to define a conclusive set of independent variables. Rather, the respective person skilled in the art is able to specify the respectively relevant independent variables for a specific field device or a specific measuring method.

It is advantageous if at least one standard parameter value is assigned to each standard parameter, if at least one device parameter value is assigned to each device parameter, if at least one application parameter value is assigned to each application parameter, and/or if at least one calculation parameter value is assigned to each calculation parameter. The respective parameter values are, for example, measured values, uncertainty values, associated in particular, probabilistic distribution functions, and/or sensitivity coefficients.

It is also advantageous if at least one neutral placeholder is assigned to at least one standard parameter value, device parameter value, application parameter value, and/or calculation parameter value. This is, in particular, sensible if a meaningful estimate and/or specification of the respective parameter value is not possible at the time of the creation of the respective set of parameters. This can, for example, happen in the case of the set of standard parameters, with standard parameters for which the set of device parameters and/or the set of application parameters has a respectively corresponding device parameter and/or application parameter. On the one hand, a number or a symbol can be used as neutral placeholder. On the other hand, a field corresponding to this parameter value can also be simply left blank, if the set of parameters is recorded in the form of a database, for example.

In an embodiment, a mathematical in particular, modular in particular, expandable model is created for calculating and/or specifying the measurement uncertainty and/or the measurement uncertainty budget.

In this respect, it is advantageous if a partial measurement uncertainty and/or a partial measurement uncertainty budget is/are also determined based upon the model in particular, based upon a subset of the set of calculation parameters.

In another embodiment, at least one sensitivity factor for at least one calculation parameter value for at least one calculation parameter is determined based upon the model. In this case, it is advantageous if the at least one sensitivity factor is used to calculate and/or specify the at least one measurement uncertainty.

Another embodiment of the method involves, in the case where the set of application parameters has a respectively corresponding application parameter, the respectively corresponding application parameter value of the corresponding application parameter being assigned to at least one calculation parameter value of at least one calculation parameter. In the case where the set of application parameters does not contain a corresponding application parameter, wherein the set of device parameters, however, includes a respectively corresponding device parameter, the respectively corresponding device parameter value of the corresponding device parameter is assigned to the calculation parameter value. In the case where neither the set of application parameters has a corresponding application parameter nor the set of device parameters has a corresponding device parameter, the respectively corresponding standard parameter value of the corresponding standard parameter is assigned to the calculation parameter value. In the case where the set of device parameters and the set of application parameters respectively have a parameter corresponding to the same standard parameter, either the respective device parameter value, the respective application parameter value, or a combination of both parameter values can be taken into account in the set of calculation parameters. If at least one standard parameter value is additionally available for a certain standard parameter with a corresponding device parameter and/or application parameter, either this standard parameter value is not taken into account for the set of calculation parameters, or a combination of the respective standard parameter value and of the respective parameter value of the corresponding device parameter and/or application parameter is used.

In one embodiment, a set of measuring point parameters, with at least one measuring point parameter and with at least one measuring point parameter value assigned to the at least one measuring point parameter, is provided, which set of measuring point parameters is a subset of the set of standard parameters. Each measuring point parameter describes an independent variable, which is specific to a measuring point at which the field device is used, wherein at least one measuring point parameter value of at least one measuring point parameter is assigned to at least one calculation parameter value of at least one calculation parameter. The set of measuring point parameters is thus another specific set of parameters, which is, in principle, subordinate to the set of standard parameters and which contains the independent variables relevant to the respective measuring point or to the respective process for which the field device is used. These independent variables can at least partially first be determined precisely when the field device is already at its operating site.

One embodiment of the method involves a mathematical combination of at least one measuring point parameter value of at least one measuring point parameter, at least one application parameter value of at least one application parameter, at least one device parameter value of at least one device parameter, and/or at least one standard parameter value of at least one standard parameter being assigned to at least one calculation parameter value of at least one calculation parameter.

It is advantageous if each standard parameter, device parameter, application parameter, calculation parameter, and/or measuring point parameter is at least one physical or chemical variable, which describes at least one independent variable at least partially.

It is also advantageous if the respectively at least one standard parameter value, device parameter value, application parameter value, calculation parameter value, and/or measuring point parameter value is a value or measured value for the physical or chemical variable, or is a measurement uncertainty or a distribution function for a measurement uncertainty.

At least one measuring point parameter value is preferably at least one value determined at or in the measuring point in particular, a value determined based upon a specific process in which the field device is operated, or based upon a statistical analysis of at least one physical or chemical variable relevant to the measuring point an input entered by an operator at the site of the measuring point, and/or a value determined during the operation of the field device at or in the measuring point.

In one advantageous embodiment of the method, in the case where no standard parameter value, device parameter value, and/or application parameter value is assigned to at least one standard parameter, device parameter, and/or application parameter assigned to at least one measuring point parameter, the measuring point parameter value of the respective at least one measuring point parameter is entered into the set of standard parameters, the set of device parameters, and/or the set of application parameters as standard parameter value, device parameter value, and/or application parameter value for the respective standard parameter, device parameter, and/or application parameter, and/or in the case where a standard parameter value, device parameter value, and/or application parameter value is already assigned to at least one standard parameter, device parameter, and/or application parameter assigned to the at least one measuring point parameter, the respective standard parameter value, device parameter value, and/or application parameter value of the respective standard parameter, device parameter, and/or application parameter is replaced by the measuring point parameter value of the measuring point parameter, is replaced by a mathematical combination, e.g., an averaging, of the respective measuring point parameter value and of the respective standard parameter value, device parameter value, and/or application parameter value, or is changed based upon the respective measuring point parameter value.

One embodiment involves, in the case where the measurement uncertainty is caused by at least two independent variables, the contribution of each of the independent variables being specified for the measurement uncertainty. Partial measurement uncertainties are thus calculated. In this way, the relative influences of individual independent variables or of groups of independent variables can, for example, be determined and analyzed. Based upon such information, measures for improving the measurement accuracy of the respective field device can preferably be derived.

Another embodiment involves the set of standard parameters, the set of device parameters, the set of application parameters, the set of measuring point parameters, and/or the mathematical model being stored and/or being able to be stored on at least one storage medium.

The aim according to the present disclosure is furthermore achieved by a computer program for determining at least one measurement uncertainty for at least one measured value of a field device with computer-readable program code elements, which, when executed on a computer, cause the computer to execute a method according to the present disclosure.

Finally, the aim according to the present disclosure is achieved by a computer program product with a medium according to the present disclosure and at least one computer-readable medium, on which at least the computer program, the set of standard parameters, the set of device parameters, the set of application parameters, the set of measuring point parameters, and/or the set of calculation parameters is/are stored at least partially.

It is pointed out that the embodiments described in connection with the method according to the present disclosure also apply mutatis mutandis to the computer program according to the present disclosure and to the computer program product according to the present disclosure.

BRIEF DESCRIPTION OF THE DRAWINGS

The present disclosure is explained in more detail with reference to the following figures. These show.

DETAILED DESCRIPTION

A value p, determined by means of a field device, for a process variable P is fundamentally afflicted by a measurement error, which is usually specified in the form of a measurement uncertainty $\Delta P$ for this measured value. The following applies:

$$P = p +/- \Delta P$$

where the measurement uncertainty $\Delta P$ is caused by various independent variables $E_1$-$E_n$, which must be known as precisely as possible in order to determine the measurement uncertainty $\Delta P$ precisely.

Figure 1:
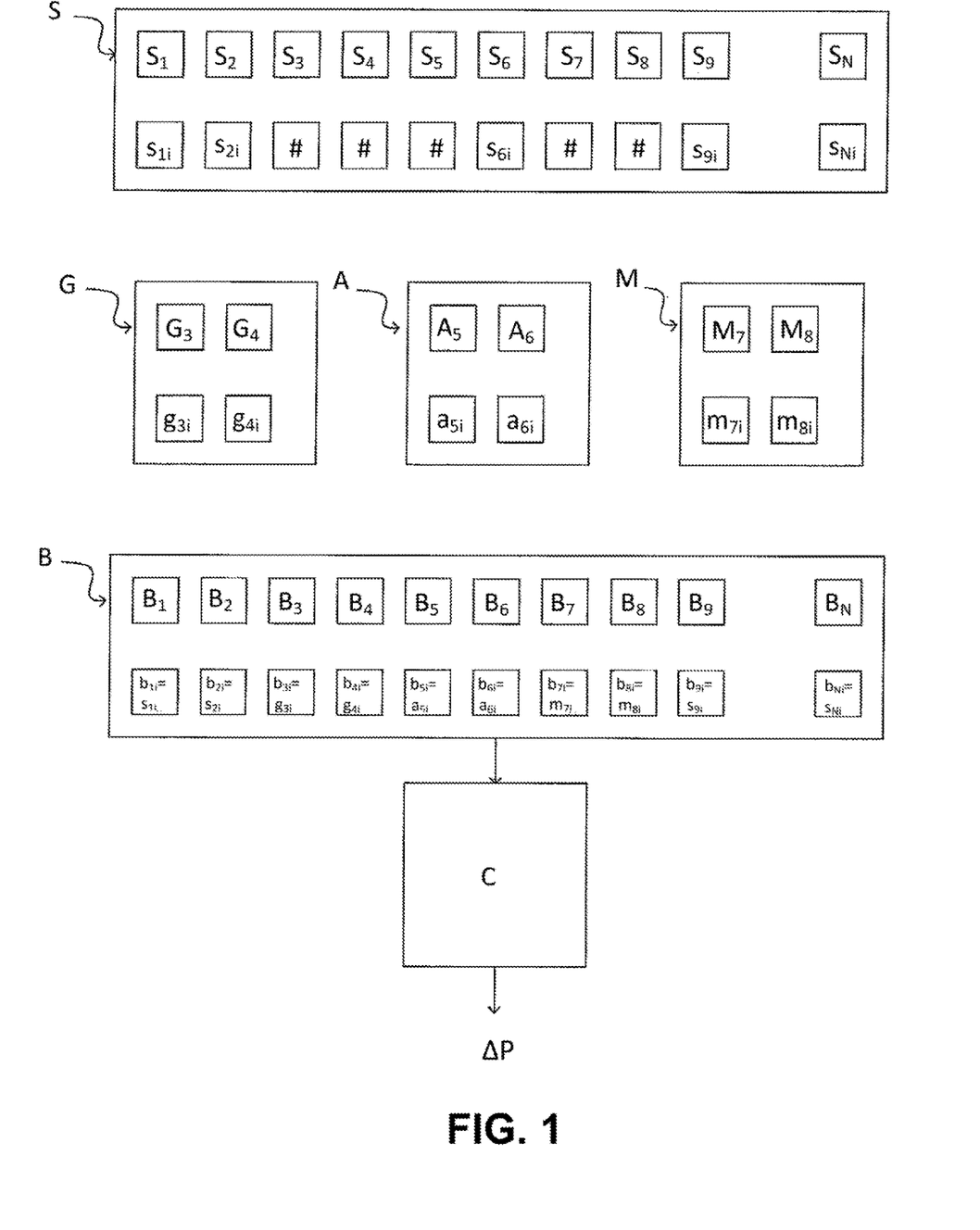
FIG. 1 shows a schematic illustration of the sequence of the method according to the present disclosure.

FIG. 1 shows a schematic illustration of the set of parameters relevant to the method according to the present disclosure and explains their interaction for carrying out the method, by way of example. The relevant independent variables $E_1$-$E_N$ [not shown] are combined in a set of standard parameters S in the form of the standard parameters $S_1$-$S_N$. To each standard parameter $S_1$-$S_N$ is respectively assigned at least one standard parameter value $s_{1i}$-$s_{Ni}$.

The letter "i" represents the number of parameter values respectively assigned to a parameter (in the case of the other sets of parameters as well). For the sake of clarity, the same letter "i" has here, for all parameter values, been used to denote the number. It goes without saying, however, that the number of values assigned to a parameter can vary from parameter to parameter. In the case where no value or a neutral placeholder is assigned to a parameter, the symbol (#) was also used uniformly.

In addition to the set of standard parameters S, a set of device parameters G, a set of application parameters A, and a set of measuring point parameters M also exist. It is pointed out that the set of measuring point parameters M is optional for the method according to the present disclosure.

All three sets of parameters the set of device parameters G, the set of application parameters A, and the set of measuring point parameters M are subsets of the set of standard parameters S. This means that the device parameters in this case, $G_3$ and $G_4$, respectively correspond to the standard parameters in this case, $S_3$, $S_4$, i.e., represent the same independent variable. The application parameters $A_5$, $A_6$ likewise correspond to the respective standard parameters $S_5$, $S_6$, and the measuring point parameters $M_7$ and $M_8$ to the standard parameters $S_7$ and $S_8$. Respectively corresponding parameters, preferably, basically represent the same independent variable. These respectively are, then, in principle the same parameters in different sets of parameters with different assigned parameter values, where applicable.

To each of the device parameters $G_3$, $G_4$, application parameters $A_5$, $A_6$, and measuring point parameters $M_7$, $M_8$ is respectively assigned at least one device parameter value $g_{3i}$, $g_{4i}$, at least one application parameter value $a_{5i}$, $a_{6i}$, and at least one measuring point parameter value $m_{7i}$, $m_{8i}$. With this, the device parameters $G_3$, $G_4$ respectively represent independent variables that are specific to the construction of the field device, whereas the application parameters $A_5$, $A_6$, on the other hand, represent independent variables that are specific to an application of the field device, and the measuring point parameters $M_7$, $M_8$ describe or represent independent variables that are specific to a measuring point at which the field device is used.

The various sets of parameters can be stored at various locations, or centrally at a single location. They can, for example, be recorded and stored electronically in the form of databases or the like. The set of standard parameters S can, for example, be compiled in the course of the development of the field device, whereas the set of device parameters G is preferably created within the framework of the production of the field device. The set of application parameters A, on the other hand, can be created within the framework of planned operating sites or planned applications or the like. Finally, the set of measuring point parameters M is preferably created at the operating site in particular, at least partially during the operation of the field device in an operating process. This is motivated by some independent variables $E_1, \ldots E_N$ being dependent upon the specific operating site at a measuring point in an ongoing process. The set of measuring point parameters M can, for example, be created by a customer or by service personnel on location at the operating site. The set of measuring point parameters M is also stored there, where applicable. Alternatively, it is also possible to analyze in particular, statistically several measuring points in particular, during the continued operation of the measuring points and to store the results of the analyses in a sensor administration database. The later can, for example, be updated continuously.

The recording of various parameters in different sets of parameters, which are, where applicable, created at different points in time and/or at different locations, advantageously allows for each of the relevant independent variables $E_1, \ldots E_N$ represented by a parameter to be determined as precisely as possible. The information and knowledge available during different stages, from the development to the use, of the field device are thus used optimally to determine the measurement uncertainty $\Delta P$.

It is pointed out that the individual sets of parameters S, G, A, M can be expanded continuously and that the set of standard parameters S can also be supplemented by the set of device parameters G, the set of application parameters A, and/or the set of measuring point parameters M, or be updated with respect to its standard parameter values $s_N$. For the embodiment described here, an expansion of the set of device parameters G, the set of application parameters A, and/or the set of measuring point parameters M by a new parameter necessarily involves this parameter also being added to the set of standard parameters S. The parameter values $g_{Ni}$, $a_{Ni}$, $m_{Ni}$ of the set of device parameters G, of the set of application parameters A, and/or of the set of measuring point parameters M, on the other hand, do not necessarily have to be added to the set of standard parameters S.

The set of calculation parameters B is created in order to calculate and/or specify the measurement uncertainty $\Delta P$. Said set of calculation parameters includes all standard parameters $S_N$ respectively in the form of a corresponding calculation parameter $B_N$. The calculation parameter values $b_{Ni}$ for each of the sets of calculation parameters B are composed in this case of the parameter values of the set of standard parameters S, of the set of device parameters G, of the set of application parameters A, and/or of the set of measuring point parameters M. For a certain calculation parameter value $b_{Ni}$, either a respectively corresponding parameter value from one of the other sets of parameters S, G, A, M can be used or, alternatively, several corresponding parameter values of at least two sets of parameters can be suitably offset to one another.

In the case where at least one parameter value $g_{Ni}$, $a_{Ni}$, $m_{Ni}$ is specified for a device parameter $G_{Ni}$, application parameter $A_{Ni}$, or measuring point parameter MM corresponding to a calculation parameter $B_{Ni}$, this parameter value is preferably, but not necessarily, entered into the set of calculation parameters B. Such an assignment is illustrated in FIG. 1 by way of example.

In order to calculate the measurement uncertainty and/or a measurement uncertainty budget, at least one calculation parameter value $b_{Ni}$ of at least one calculation parameter $B_{Ni}$ of the set of calculation parameters B is then used. The calculation of the measurement uncertainty $\Delta P$ and/or of the measurement uncertainty budget is preferably carried out based upon the in particular, modular mathematical model C, which can be expanded, preferably, continuously, just as with the individual sets of parameters. This model can be stored independently of the sets of parameters S, G, A, M or together with at least one of the sets of parameters preferably, with the set of standard parameters S.

For example, the mathematical model maps a measurement of a value p for a process variable P, such that the following applies to the measured value p:

$$p = P(E_1, E_2, \ldots, E_N),$$

where $E_1, \ldots E_N$ describe the respective independent variables, and the following applies to the measurement uncertainty $\Delta P$ assigned to the measured value p:

$$\Delta P(p) = \sqrt{\left(\Delta E_1 \frac{\partial p}{\partial E_1}\right)^2 + \ldots + \left(\Delta E_N \frac{\partial p}{\partial E_N}\right)^2},$$

where $\Delta E_N$ represents the uncertainty caused by a certain independent variable $E_n$ and where the partial derivatives are respectively assigned to a sensitivity coefficient.

Figure 2:
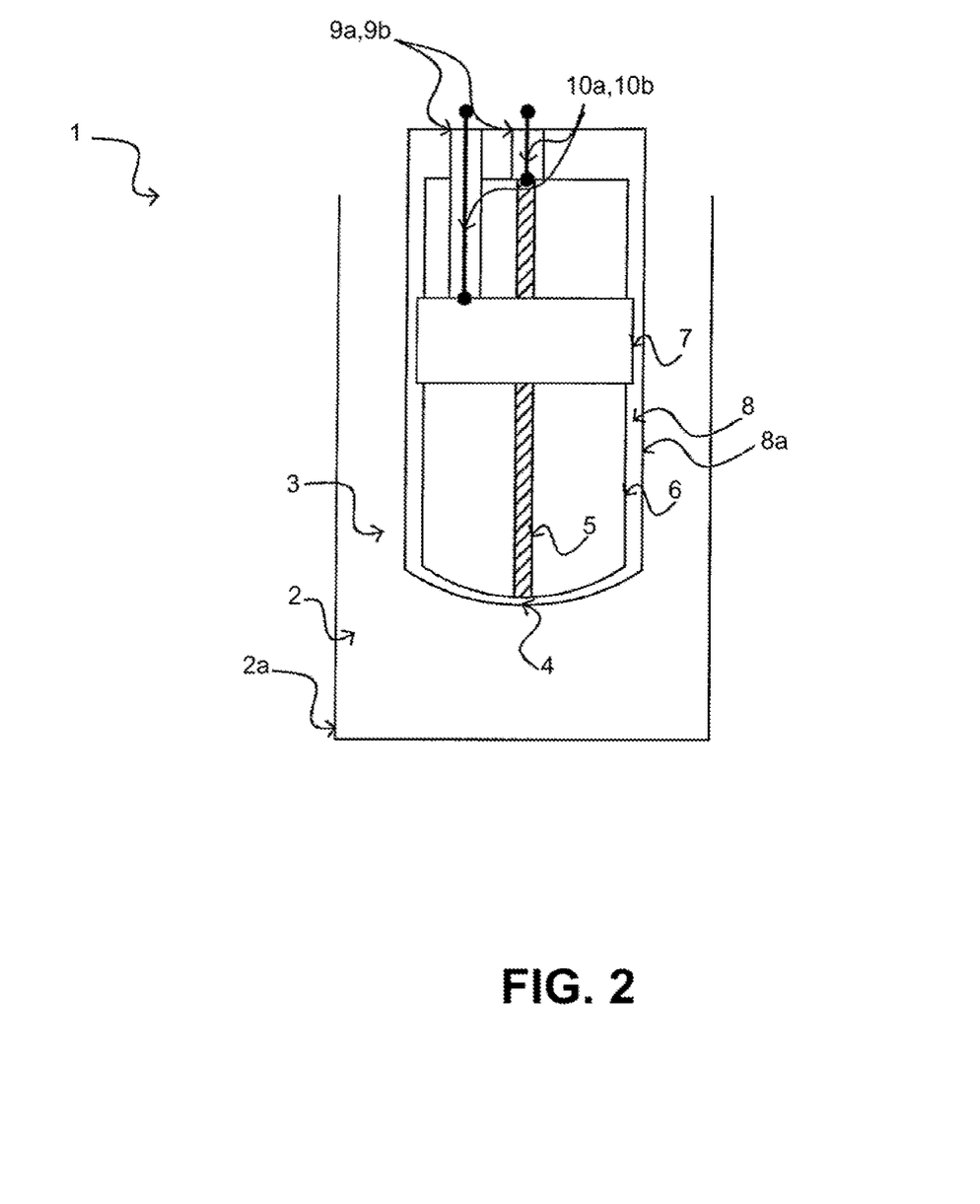
FIG. 2 shows a schematic illustration of an amperometric oxygen sensor.

It is outlined by way of example below how the measurement uncertainty $\Delta P$ for an amperometric oxygen sensor can be calculated based upon the present disclosure. For this purpose, FIG. 2 shows a schematic illustration of such a sensor 1 for determining the concentration $c_x$ of oxygen, $O_2$. The electrochemical sensor 1 is designed in the form of a measuring probe 3 with an immersion section for immersing the measuring probe 3 in the respective measured medium 2, which is located in the container 2a. The basic structure of such a sensor 1 and its functional principle are, per se, known from the prior art.

The measuring probe 3 has an electrolyte chamber 8a, which is filled with an electrolyte 8 and ends on the medium side with a sensor membrane 4. A glass body 6 with a first sensor electrode 5, which consists of platinum, for example, and serves as cathode, and a second electrode 7, which consists of silver, for example, and serves as anode, protrudes into the electrolyte chamber 8a. The electrodes are in particular, electrically connected within the measuring probe 3 via connecting lines 10a, 10b through the insulated feedthroughs 9a, 9b.

The electrodes 5, 7 are brought into contact with the measured medium 2 via the sensor membrane 4. From the measured medium 2, oxygen $O_2$ diffuses into the electrolyte chamber 8a filled with the electrolyte 8, so that the following reactions take place at the cathode 5 and the anode 7:

At the cathode, is converted, while at the anode, silver, for example, is oxidized:

In order to determine the oxygen concentration $c_x$, a suitable voltage is applied via the connecting lines 10a, 10b to the electrodes 5, 7, and the flowing current I is measured, which is proportional to the oxygen concentration of the measured medium 2. The following applies $$I_{mess} = Ac_x + B$$

The necessity of knowing as accurately as possible all independent variables and their interactions is explained below on the basis of a few exemplary independent variables for the case of an amperometric oxygen sensor.

A particularly relevant independent variable is, in this case, for example, the temperature T of the measured medium 2, since it influences the membrane permeability to the oxygen $O_2$ present in the measured medium 2. The influence of the temperature T can, for example, be expressed by a factor, which can, in a temperature range specific to the respective field device 1, in turn be approximated by a polynomial. For the determination of the oxygen concentration $c_x$, a temperature compensation function, e.g., in the form of a polynomial function, must accordingly always be taken into account.

The individual coefficients of the polynomial are individual constants, which are taken into account for the determination of the measurement uncertainty in addition to the individual parameters representing the relevant independent variables. Other constants included in the determination of the measurement uncertainty $\Delta P$ are given by the pressure often for correction to the standard pressure $p_{std}=1013$ millibar (mbar) in accordance with the standard conditions the saturation concentration of oxygen often specified for air-saturated water under standard conditions 8.5 mg/l and the oxygen partial pressure. This is thus a complex interaction of many different factors.

Two additional important independent variables for the measurement accuracy of an amperometric oxygen sensor are given by the sensor slope, as well as by the sensor zero point of a sensor characteristic curve. The parameters representing these independent variables are thus preferably part of the set of device parameters G, wherein parameter values for these parameters are determined, for example, in the course of a factory calibration of the field device 1. Since the oxygen concentration in ambient air can be assumed to be a constant 20% ($pO_2$=0.2), a calibration and/or adjustment of a sensor with respect to the sensor slope is possible by operating the sensor in air. To this end, a conversion from the current air pressure to standard pressure $p_{std}=1013$ mbar must, however, take place. For a calibration/adjustment of the sensor zero point, on the other hand, it is advisable to operate the sensor in an oxygen-free medium.

A set of standard parameters S for an amperometric oxygen sensor 1 thus comprises, for example, the sensor slope, the sensor zero point, and/or the temperature. In addition, independent variables given by the respectively implemented electronic measuring unit must be taken into account. These independent variables can, for example, be determined by specific measurements under known conditions. The environmental conditions and many other things also play a vital role.

Some relevant independent variables can, for example, be determined within the framework of a factory calibration of the respective field device, or even several field devices. If such a calibration takes place in an open system, the respective environmental conditions, e.g., the air pressure respectively prevailing in the environment of the sensor, influence the respective result of the factory calibration. Such dependencies must then, for example, be taken into account in a further calibration taking place at the operating site of the respective sensor. Other relevant environmental conditions, depending upon the type of sensor 1, are given by, for example, the temperature, the pressure, or the salinity of a medium, provided that the factory calibration is, for example, carried out in a reference medium.

Other independent variables can, for example, be estimated based upon operating the sensor 1 for a fictitious standard application and later be determined more precisely based upon the set of application parameters A and/or the set of measuring point parameters M.

The invention claimed is:

1. A computer-implemented method for determining at least one measurement uncertainty for at least one measured value of a field device, comprising:
   creating a set of calculation parameters that includes at least all standard parameters of a set of standard parameters in the form of a respectively corresponding calculation parameter, wherein each standard parameter of the set of standard parameters comprising at least one standard parameter represents an independent variable causing the at least one measurement uncertainty, wherein to each calculation parameter is assigned at least one calculation parameter value in the form of at least:
   one standard parameter value of a respectively corresponding standard parameter;
   one device parameter value of a respectively corresponding device parameter of a set of device parameters, which consists of a subset of the set of standard parameters, wherein each of the device parameters represents at least one independent variable, which is specific to the field device; and/or
   one application parameter value of a respectively corresponding application parameter of a set of application parameters, which consists of a subset of the set of standard parameters, wherein each of the application parameters represents at least one independent variable that is specific to an application of the field device; and
   calculating and/or specifying the at least one measurement uncertainty and/or a measurement uncertainty budget based upon at least one calculation parameter value of at least one calculation parameter;
   wherein, where the set of application parameters has a respectively corresponding application parameter, the respectively corresponding application parameter value of the corresponding application parameter is assigned to at least one calculation parameter value of at least one calculation parameter,
   wherein when the set of application parameters does not contain a corresponding application parameter and the set of device parameters includes a respectively corresponding device parameter, the respectively corresponding device parameter value of the corresponding device parameter is assigned to at least one calculation parameter value, and
   wherein in the case where neither the set of application parameters has a corresponding application parameter nor the set of device parameters has a corresponding device parameter, the respectively corresponding standard parameter value of the corresponding standard parameter is assigned to at least one calculation parameter value;
   wherein a processor performs a calculation of a measured value deviation using a standard parameter representing an independent variable;
   completing the at least one measured value of the field device based on the measurement uncertainty; and
   controlling an automation process using the completed measured value.

2. The method of claim 1, wherein the at least one independent variable is an environmental condition, a process condition, information from a calibration, qualification, and/or adjustment of the field device, or at least one secondary variable that is included in the determination of a measured value measured by means of the field device.

3. The method of claim 1, wherein to each standard parameter is assigned at least one standard parameter value, to each device parameter is assigned at least one device parameter value, to each application parameter is assigned at least one application parameter value, and/or to each calculation parameter is assigned at least one calculation parameter value.

4. The method of claim 1, wherein to at least one standard parameter value, device parameter value, application parameter value, and/or calculation parameter value is assigned at least one neutral placeholder.

5. The method of claim 1, wherein a mathematical, modular, expandable model for calculating and/or specifying the measurement uncertainty and/or the measurement uncertainty budget is created.

6. The method of claim 5, wherein a partial measurement uncertainty and/or a partial measurement uncertainty budget is/are determined based upon the model, based upon a subset of the set of calculation parameters.

7. The method of claim 1, wherein at least one sensitivity factor for at least one calculation parameter value of at least one calculation parameter is determined based upon the model.

8. The method of claim 7, wherein the at least one sensitivity factor is used to calculate and/or specify the at least one measurement uncertainty.

9. The method of claim 1, wherein a set of measuring point parameters with at least one measuring point parameter and with at least one measuring point parameter value assigned to the at least one measuring point parameter is provided, which set of measuring point parameters is a subset of the set of standard parameters, wherein each measuring point parameter describes an independent variable, which is specific to a measuring point at which the field device is used, and wherein at least one measuring point parameter value of at least one measuring point parameter is assigned to at least one calculation parameter value of at least one calculation parameter.

10. The method of claim 1, wherein a mathematical combination of at least one measuring point parameter value of at least one measuring point parameter, at least one application parameter value of at least one application parameter, at least one device parameter value of at least one device parameter, and/or at least one standard parameter value of at least one standard parameter is assigned to at least one calculation parameter value of at least one calculation parameter.

11. The method of claim 1, wherein each standard parameter, device parameter, application parameter, calculation parameter, and/or measuring point parameter is at least one physical or chemical variable, which describes at least one independent variable at least partially.

12. The method of claim 11, wherein the respectively at least one standard parameter value, device parameter value, application parameter value, calculation parameter value, and/or measuring point parameter value is a value or measured value for the physical or chemical variable or is a measurement uncertainty or a distribution function for a measurement uncertainty.

13. The method of claim 9, wherein at least one measuring point parameter value is at least one value determined at or in the measuring point, the at least one value determined based upon a specific process in which the field device is operated or based upon a statistical analysis of at least one physical or chemical variable relevant to the measuring point; an input entered by an operator at a site of the measuring point; and/or a value determined during the operation of the field device at or in the measuring point.

14. The method of claim 1, wherein:
where no standard parameter value, device parameter value, and/or application parameter value is assigned to at least one standard parameter, device parameter, and/or application parameter assigned to at least one measuring point parameter, the measuring point parameter value of the respective at least one measuring point parameter is entered into the set of standard parameters, the set of device parameters, and/or the set of application parameters as standard parameter value, device parameter value, and/or application parameter value for the respective standard parameter, device parameter, and/or application parameter; and/or
where a standard parameter value, device parameter value, and/or application parameter value is already assigned to at least one standard parameter, device parameter, and/or application parameter assigned to the at least one measuring point parameter, the respective standard parameter value, device parameter value, and/or application parameter value of the respective standard parameter, device parameter, and/or application parameter is replaced by the measuring point parameter value of the measuring point parameter, is replaced by a mathematical combination of the respective measuring point parameter value and of the respective standard parameter value, device parameter value, and/or application parameter value, or is changed based upon the respective measuring point parameter value.

15. The method of claim 1, wherein, where the measurement uncertainty is caused by at least two independent variables, the contribution of each of the independent variables is specified for the measurement uncertainty.

16. The method of claim 5, wherein the set of standard parameters, the set of device parameters, the set of application parameters, the set of measuring point parameters, and/or the model are stored on at least one storage medium.

17. A computer program for determining at least one measurement uncertainty for at least one measured value of a field device using computer-readable program code elements, which, when executed on a computer, perform operations comprising:
creating a set of calculation parameters that includes at least all standard parameters of a set of standard parameters in the form of a respectively corresponding calculation parameter, wherein each standard parameter of the set of standard parameters comprising at least one standard parameter represents an independent variable causing the at least one measurement uncertainty, wherein to each calculation parameter is assigned at least one calculation parameter value in the form of at least:
one standard parameter value of a respectively corresponding standard parameter;
one device parameter value of a respectively corresponding device parameter of a set of device parameters, which consists of a subset of the set of standard parameters, wherein each of the device parameters represents at least one independent variable, which is specific to the field device; and/or
one application parameter value of a respectively corresponding application parameter of a set of application parameters, which consists of a subset of the set of standard parameters, wherein each of the application parameters represents at least one independent variable that is specific to an application of the field device; and
calculating and/or specifying the at least one measurement uncertainty and/or a measurement uncertainty budget based upon at least one calculation parameter value of at least one calculation parameter;

wherein the set of application parameters has a respectively corresponding application parameter, the respectively corresponding application parameter value of the corresponding application parameter is assigned to at least one calculation parameter value of at least one calculation parameter, wherein the set of application parameters does not contain a corresponding application parameter and the set of device parameters includes a respectively corresponding device parameter, the respectively corresponding device parameter value of the corresponding device parameter is assigned to at least one calculation parameter value, and wherein in the case where neither the set of application parameters has a corresponding application parameter nor the set of device parameters has a corresponding device parameter, the respectively corresponding standard parameter value of the corresponding standard parameter is assigned to at least one calculation parameter value;

wherein a processor performs a calculation of a measured value deviation using a standard parameter representing an independent variable;

completing the at least one measured value of the field device based on the measurement uncertainty; and controlling an automation process using the completed measured value.

18. A computer program product comprising:

at least one computer-readable medium; and a computer program for determining at least one measurement uncertainty for at least one measured value of a field device using computer-readable program code elements, which, when executed on a computer, perform operations comprising:

creating a set of calculation parameters that includes at least all standard parameters of a set of standard parameters in the form of a respectively corresponding calculation parameter, wherein each standard parameter of the set of standard parameters comprising at least one standard parameter represents an independent variable causing the at least one measurement uncertainty, wherein to each calculation parameter is assigned at least one calculation parameter value in the form of at least:

one standard parameter value of a respectively corresponding standard parameter;

one device parameter value of a respectively corresponding device parameter of a set of device parameters, which consists of a subset of the set of standard parameters, wherein each of the device parameters represents at least one independent variable, which is specific to the field device; and/or one application parameter value of a respectively corresponding application parameter of a set of application parameters, which consists of a subset of the set of standard parameters, wherein each of the application parameters represents at least one independent variable that is specific to an application of the field device; and calculating and/or specifying the at least one measurement uncertainty and/or a measurement uncertainty budget based upon at least one calculation parameter value of at least one calculation parameter, wherein:

where no standard parameter value, device parameter value, and/or application parameter value is assigned to at least one standard parameter, device parameter, and/or application parameter assigned to at least one measuring point parameter, the measuring point parameter value of the respective at least one measuring point parameter is entered into the set of standard parameters, the set of device parameters, and/or the set of application parameters as standard parameter value, device parameter value, and/or application parameter value for the respective standard parameter, device parameter, and/or application parameter; and/or where a standard parameter value, device parameter value, and/or application parameter value is already assigned to at least one standard parameter, device parameter, and/or application parameter assigned to the at least one measuring point parameter, the respective standard parameter value, device parameter value, and/or application parameter value of the respective standard parameter, device parameter, and/or application parameter is replaced by the measuring point parameter value of the measuring point parameter, is replaced by a mathematical combination of the respective measuring point parameter value and of the respective standard parameter value, device parameter value, and/or application parameter value, or is changed based upon the respective measuring point parameter value, and wherein at least the computer program, the set of standard parameters, the set of device parameters, the set of application parameters, the set of measuring point parameters, and/or the set of calculation parameters is/are at least partially stored on the at least one computer-readable medium;

wherein the set of application parameters has a respectively corresponding application parameter, the respectively corresponding application parameter value of the corresponding application parameter is assigned to at least one calculation parameter value of at least one calculation parameter, wherein the set of application parameters does not contain a corresponding application parameter and the set of device parameters includes a respectively corresponding device parameter, the respectively corresponding device parameter value of the corresponding device parameter is assigned to at least one calculation parameter value, and wherein in the case where neither the set of application parameters has a corresponding application parameter nor the set of device parameters has a corresponding device parameter, the respectively corresponding standard parameter value of the corresponding standard parameter is assigned to at least one calculation parameter value;

wherein a processor performs a calculation of a measured value deviation using a standard parameter representing an independent variable;

completing the at least one measured value of the field device based on the measurement uncertainty; and controlling an automation process using the completed measured value.

* * * * *